US012731130B2

(12) United States Patent
Ahmad et al.

(10) Patent No.: US 12,731,130 B2
(45) Date of Patent: Sep. 8, 2026

(54) METHOD AND SYSTEM FOR ACTIVATING WALLET PRIVATE KEYS THROUGH BLOCKCHAIN ADDRESSES

(71) Applicant: Mastercard International Incorporated, Purchase, NY (US)

(72) Inventors: Mohammed Sadiq Ahmad, Dublin, CA (US); Saravana Perumal Shanmugam, Fremont, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 18 days.

(21) Appl. No.: 18/422,279

(22) Filed: Jan. 25, 2024

(65) Prior Publication Data

US 2024/0257105 A1 Aug. 1, 2024

Related U.S. Application Data

(60) Provisional application No. 63/441,618, filed on Jan. 27, 2023.

(51) Int. Cl.
*G06Q 20/36* (2012.01)
*G06Q 20/34* (2012.01)
(Continued)

(52) U.S. Cl.
CPC ....... *G06Q 20/3672* (2013.01); *G06Q 20/341* (2013.01); *G06Q 20/3825* (2013.01);
(Continued)

(58) Field of Classification Search
CPC ............. G06Q 20/3672; G06Q 20/341; G06Q 20/3825; G06Q 20/3829; G06Q 20/389;
(Continued)

(56) References Cited

U.S. PATENT DOCUMENTS 10,846,663 B2 * 11/2020 Juels .................... G06Q 20/389
11,244,297 B1 * 2/2022 Puffer ................ G06Q 20/3226
(Continued)

FOREIGN PATENT DOCUMENTS

KR 20200030884 A 3/2020

OTHER PUBLICATIONS

Notification of Transmittal of the International Search Report and the Written Opinion of the International Searching Authority, or the Declaration, issued May 14, 2024, in corresponding International Application No. PCT/US2024/012872, 9 pages.
(Continued)

*Primary Examiner* — Jalatee Worjloh
(74) *Attorney, Agent, or Firm* — Panitch Schwarze Belisario & Nadel LLP

(57) ABSTRACT

A method for registration of an identified blockchain wallet using a payment card includes: receiving payment details for a payment card issued for a transaction account, the payment details including a card identifier and received from one of: an integrated circuit payment card and a financial application program; receiving wallet details for a blockchain wallet including a wallet identifier; transmitting the card identifier and the wallet identifier to an activation server that stores an association between the wallet identifier and the transaction account; receiving an activation message from the activation server; and transmitting an instruction to the integrated circuit payment card or the financial application program to enable use of a private key of a cryptographic key pair associated with the blockchain wallet.

16 Claims, 6 Drawing Sheets

(51) Int. Cl.
*G06Q 20/38* (2012.01)
*G06Q 20/40* (2012.01)

(52) U.S. Cl.
CPC ....... *G06Q 20/3829* (2013.01); *G06Q 20/389* (2013.01); *G06Q 20/401* (2013.01)

(58) Field of Classification Search
CPC ............... G06Q 20/401; G06Q 20/326; G06Q 20/3263; G06Q 20/355; G06Q 20/3552; G06Q 20/36; G06Q 2220/00; H04L 2209/56; H04L 9/3247; H04L 9/50
See application file for complete search history.

(56) References Cited

U.S. PATENT DOCUMENTS

| | | | | |
|---|---|---|---|---|
| 2017/0124535 | A1 | 5/2017 | Juels et al. | |
| 2017/0337556 | A1 | 11/2017 | Kohli | |
| 2018/0330348 | A1 | 11/2018 | Uhr et al. | |
| 2020/0210594 | A1 | 7/2020 | Talmor et al. | |
| 2021/0042733 | A1 | 2/2021 | Suresh et al. | |
| 2021/0406871 | A1 | 12/2021 | Ravinathan et al. | |
| 2022/0270093 | A1 | 8/2022 | Futoransky et al. | |
| 2023/0110817 | A1* | 4/2023 | Nieto | G06Q 10/06 726/28 |

OTHER PUBLICATIONS

European Search Report dated Jun. 9, 2026, issued in the corresponding European Patent Application No. 24747778.9 (9 Pages).
First Examination Report issued by the Indian Patent Office on Aug. 7, 2026, in corresponding Indian Patent Application No. 202547066068 (12 pages).

* cited by examiner

400

METHOD AND SYSTEM FOR ACTIVATING WALLET PRIVATE KEYS THROUGH BLOCKCHAIN ADDRESSES

FIELD

The present disclosure relates to the activation of blockchain wallets, specifically the registration and activation of a blockchain wallet through the use of an issued payment card.

BACKGROUND

Blockchain wallets typically come in two different forms: custodied and self-custody wallets. A custodied wallet is one where a different entity than the consumer is in possession of the private key that is used to perform transactions, such as a cryptocurrency exchange, a bank, etc., which of course requires some knowledge of the consumer to ensure the consumer is authorized to conduct a transaction, etc. A self-custody wallet is where the consumer themselves is in possession of the private key for their blockchain wallet, such as on their personal desktop computer, smart phone, etc. With a self-custody wallet, the consumer can engage in transactions on a blockchain entirely anonymously, without providing any identity information to the blockchain, any transacting parties, etc.

Traditionally, blockchains have operated with anonymity where the identity of any involved parties can remain anonymous for transactions. However, because of fraudulent actions by consumers, cryptographic exchanges, and other parties, there is a growing interest in regulating cryptocurrency transactions and other transactions conducted using blockchains. The imposition of regulations can result in a requirement for each consumer to provide identification in order to participate in transactions that are stored on a blockchain. Currently, blockchain networks are largely unable to perform such functions, and due to the decentralization of most blockchain networks, compliance with such regulations would be exceedingly difficult and costly to implement.

Thus, there is a need for a technological solution that can provide for identification of consumers in a blockchain network in a manner that can be adopted with minimal interference for blockchain networks and consumers.

SUMMARY

The present disclosure provides a description of systems and methods for registration of identified blockchain wallets using payment cards. A consumer can be issued a payment card for a transaction account in either a physical format (e.g., an integrated circuit payment card) or virtual format (e.g., a tokenized payment card stored on a smart phone or other computing device). The consumer can request the generation of a new blockchain wallet to be associated with the transaction account, where the cryptographic key pair for the blockchain wallet can be supplied (e.g., by the financial institution or other suitable entity) or generated directly by the consumer's integrated circuit payment card or their computing device. The blockchain wallet can be locked or disabled upon creation until the identity of the consumer is registered. A request can be submitted by the consumer to an activation server that includes identifiers for the payment card as well as the blockchain wallet. The activation server can record an association between the transaction account and the blockchain wallet and provide an activation message to the consumer's computing device. The computing device can then generate an instruction for the payment card or application program that unlocks or enables the blockchain wallet for use in blockchain transactions. As a result, the consumer of a blockchain wallet can have their identity registered without modification to existing blockchain practices and with minimal interference with the consumer.

A method for registration of an identified blockchain wallet using a payment card includes: receiving, by a receiver of a computing device, payment details for a payment card issued for a transaction account, the payment details including at least a card identifier, wherein the payment details are received from one of: an integrated circuit payment card and a financial application program; receiving, by the receiver of the computing device, wallet details for a blockchain wallet, the wallet details including at least a wallet identifier; transmitting, by a transmitter of the computing device, at least the card identifier and the wallet identifier to an activation server, wherein the activation server stores an association between the wallet identifier and the transaction account; receiving, by the receiver of the computing device, an activation message from the activation server; and transmitting, by the transmitter of the computing device, an instruction to the integrated circuit payment card or the financial application program to enable use of a private key of a cryptographic key pair associated with the blockchain wallet.

A system for registration of an identified blockchain wallet using a payment card includes: an activation server; a computing device; and one of: an integrated circuit payment card and a financial application program, wherein the computing device includes a receiver receiving payment details for a payment card issued for a transaction account, the payment details including at least a card identifier, wherein the payment details are received from the integrated circuit payment card or the financial application program, and receiving wallet details for a blockchain wallet, the wallet details including at least a wallet identifier, and a transmitter transmitting at least the card identifier and the wallet identifier to an activation server, wherein the activation server stores an association between the wallet identifier and the transaction account, wherein the receiver of the computing device further receives an activation message from the activation server, and the transmitter of the computing device further transmits an instruction to the integrated circuit payment card or the financial application program to enable use of a private key of a cryptographic key pair associated with the blockchain wallet.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

System for Registration of Blockchain Wallets Using Payment Cards

Figure 1:
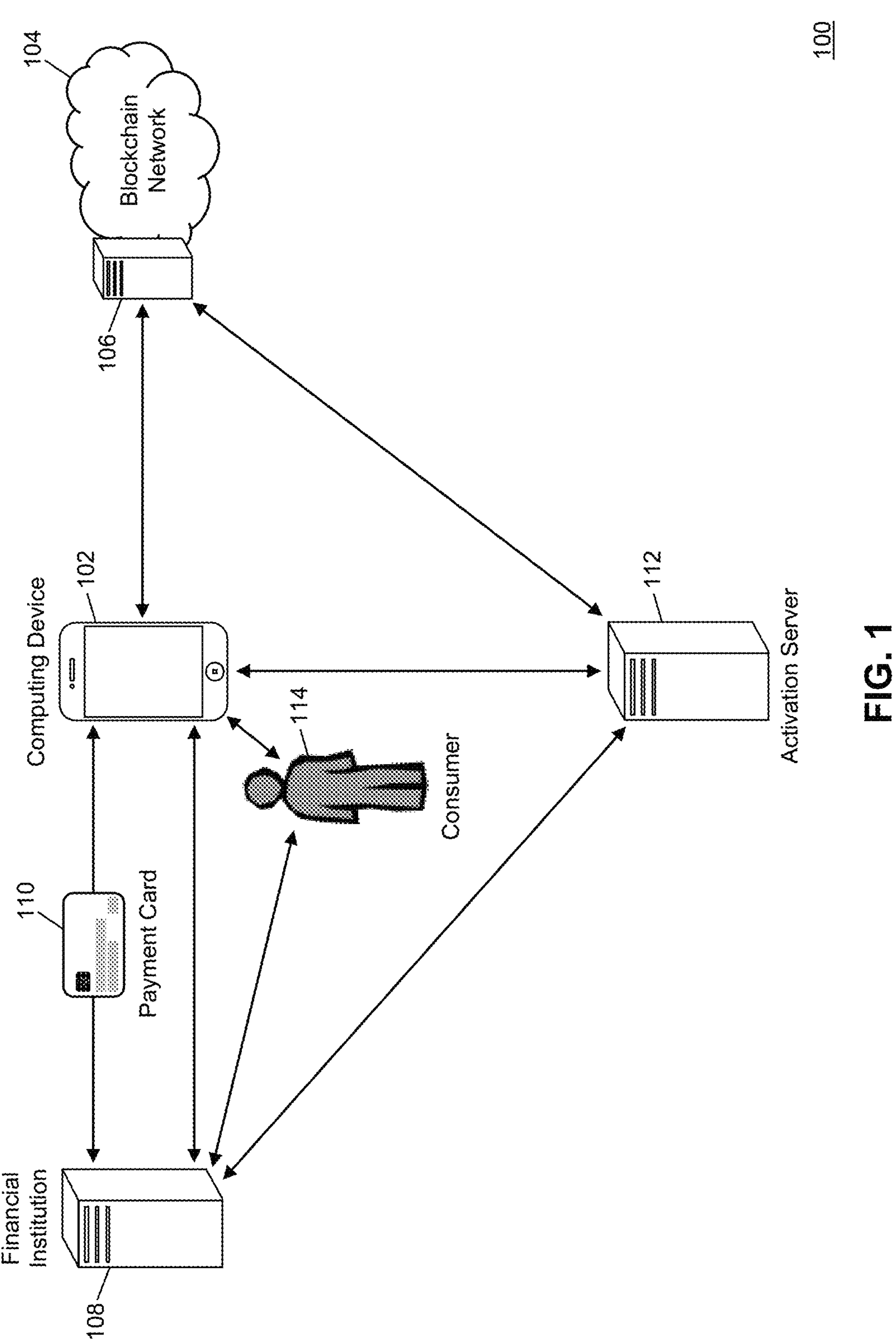
FIG. 1 is a block diagram illustrating a high-level system architecture for registration of blockchain wallets using payment cards in accordance with exemplary embodiments.

FIG. 1 illustrates a system 100 for the registration of a consumer identity associated with a blockchain wallet via the use of an issued payment card.

The system 100 can include a computing device 102. The computing device 102, discussed in more detail below, can be a device possessed or otherwise used by a consumer 114, such as a desktop computer, laptop computer, tablet computer, notebook computer, cellular phone, smart phone, smart watch, smart television, wearable computing device, automated teller machine, point of sale system, etc. The consumer 114 may utilize the computing device 102 to register their identity along with a blockchain wallet for use in a regulated blockchain via the use of a payment card 110.

Figure 5:
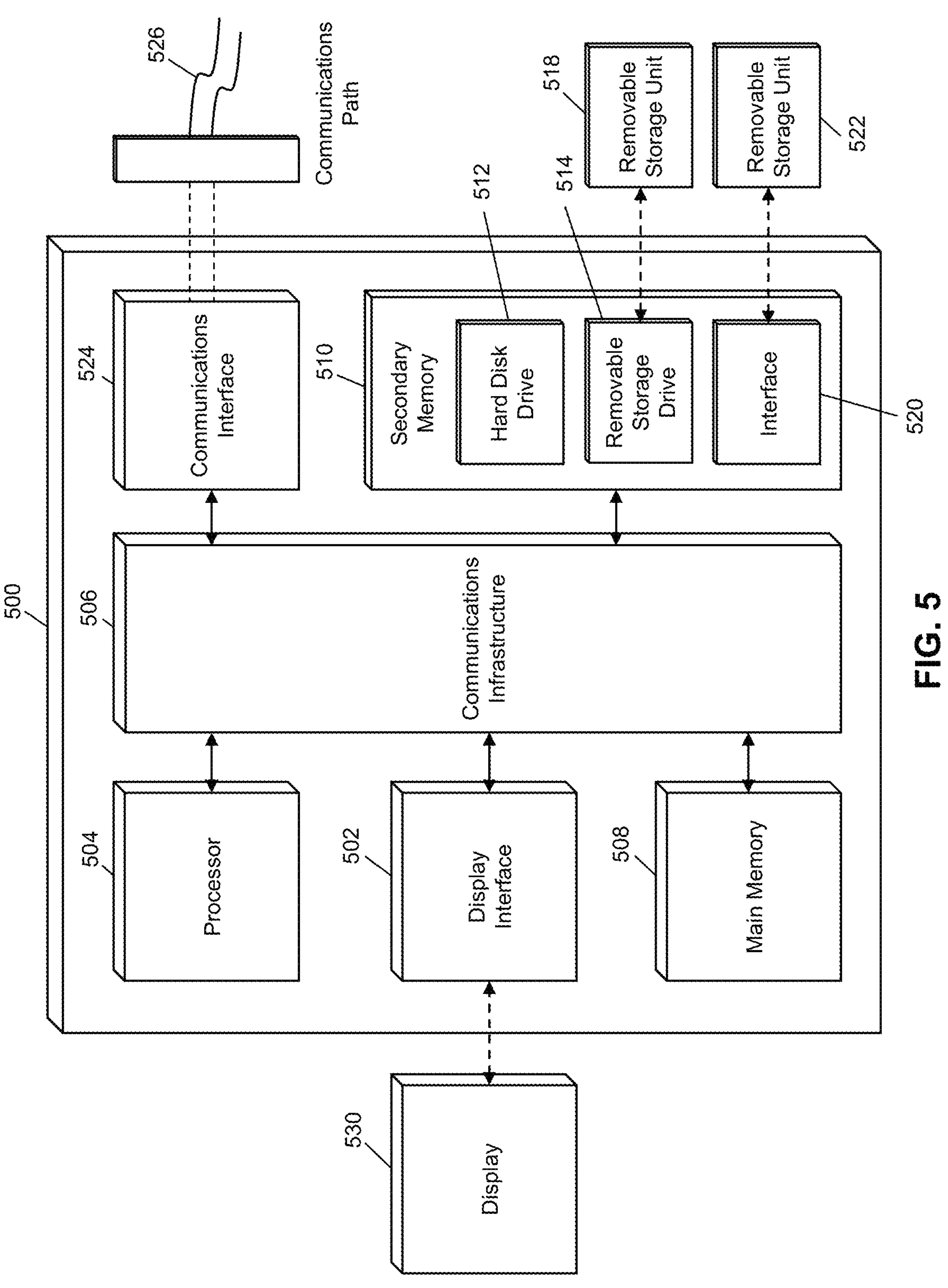
FIG. 5 is a block diagram illustrating a computer system architecture in accordance with exemplary embodiments.

The system 100 can include a blockchain network 104. The blockchain network 104 can be comprised of a plurality of blockchain nodes 106. Each blockchain node 106 can be a computing system, such as illustrated in FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 106 in the blockchain network 104 prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" can refer specifically to the private key. In other cases, the term "blockchain wallet" can refer to a computing device (e.g., computing device 102, etc.) that stores the private key for use thereof in blockchain transactions. For instance, each computing device can each have their own private key for respective cryptographic key pairs and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable. A blockchain transaction can consist of at least: a digital signature of the sender of currency (e.g., a first computing device 102) that is generated using the sender's private key, a blockchain address of the recipient of currency (e.g., a second computing device 102) generated using the recipient's public key, and a blockchain currency amount that is transferred, or other data being stored. In some blockchain transactions, the transaction can also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction can also include the sender's public key, for use by an entity in validating the transaction. For the traditional processing of a blockchain transaction, such data can be provided to a blockchain node 106 in the blockchain network 104, either by the sender or the recipient. The node can verify the digital signature using the public key in the cryptographic key pair of the sender's wallet, and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other blockchain nodes 106 in the blockchain network 104 before being added to the blockchain and distributed to all the blockchain nodes 106 in the blockchain network 104, respectively, in traditional blockchain implementations. In cases where a blockchain data value cannot be related to a blockchain transaction, but instead the storage of other types of data, blockchain data values can still include or otherwise involve the validation of a digital signature.

In the system 100, the blockchain can be a regulated blockchain where the blockchain network 104 requires the identity of the consumer 114 in control of a blockchain wallet to be registered before the blockchain wallet is unlocked for use in blockchain transactions stored on the regulated blockchain. In the system 100, consumers and their blockchain wallets can be registered via the use of a payment card 110 that is issued to the consumer 114. For the payment card 100 to be issued, various identifying information is gathered under Know Your Customer (KYC) requirements and business practices.

The system 100 can include a financial institution 108. The financial institution 108 can be a bank or other entity that issues transaction accounts to consumers 114 for use in sending or receiving funds in electronic payment transactions. As part of the issuance of a transaction account to the consumer 114, the financial institution 108 can issue a payment card 110 to the consumer 114. The payment card 110 can be a physical card, such as an integrated circuit card, also known as a "chip" card, or can be a virtual card, such as a tokenized payment card that can be used via a specialized application program on the computing device 102. For instance, the computing device 102 can store and execute an application program therein associated with the financial institution 108 where the tokenized payment card can be utilized using the application program. The financial institution 108 can issue the transaction account and payment card 110 to the consumer 114 only after receiving sufficient identifying information about the consumer 114 using traditional methods and systems.

The physical payment card 110 or computing device 102 if the payment card 110 is virtual, as applicable, can store payment details regarding the payment card 110 for use in conducting payment transactions using the payment card 110. The payment details can include any data suitable for use in conducting payment transactions, which can include a transaction account number, name, billing address, expiration date, security code, etc. In the system 100, the payment details for the payment card 110 can include a card identifier, which is a unique value associated with the payment card 110 for use in the identification thereof in communications conducted herein. The card identifier can be comprised of data or a portion of data identified above (e.g., the transaction account number, the last four digits of the transaction account number, etc.) or a separately generated value, such as a hash value, randomly generated alphanumeric value, etc.

In the system 100, the consumer 114 can utilize the computing device 102 to request the creation of a new blockchain wallet for use in transactions on the blockchain associated with the blockchain network 104. The consumer 114 can, using a suitable input device of the computing device 102, request that the payment card 110 be used for identification of the consumer 114 for registration of the blockchain wallet. The computing device 102 can receive the consumer's input and initiate the creation of the new blockchain wallet. In some cases, the blockchain wallet (e.g., cryptographic keys used for blockchain transactions) can be generated by the computing device 102, such as via the application program associated with the financial institution 108 or other application program. In other cases, the blockchain wallet can be generated by the payment card 110 upon request by the computing device 102, such as by the execution of suitable code using the integrated circuit of the payment card 110. In such embodiments, the blockchain wallet and data associated therewith can be stored locally in memory of the payment card 110.

Once the blockchain wallet has been generated, a wallet identifier can be supplied to the computing device 102 (e.g., by the payment card 110, application program that generated the cryptographic key pair, etc.). The wallet identifier can be a unique value used for identification of the blockchain wallet among other blockchain wallets registered for the blockchain network 104. In some cases, the wallet identifier can be the public key of the cryptographic key pair that serves as the blockchain wallet.

In an exemplary embodiment, the payment card 110 or computing device 102 if the payment card 110 is virtual, as applicable, can lock or otherwise disable the blockchain wallet (e.g., or private key of the blockchain wallet) for use in blockchain transactions. The blockchain wallet can remain locked and disabled for use until an activation message has been supplied thereto by an activation server 112 that is authorized by the blockchain network 104. The activation server 112 can be a computing system, such as illustrated in FIG. 5 and discussed in more detail below, that is configured to register consumer identifies for blockchain wallets for compliance with applicable regulations or requirements. In some cases, the activation server 112 can be a blockchain node 106 in the blockchain network 104. In some instances, the activation server 112 can be part of the financial institution 108.

After generation of the blockchain wallet, the computing device 102 can submit an activation request to the activation server 112 using a suitable communication network and method. The activation request can include at least the card identifier associated with the payment card 110 and the wallet identifier associated with the generated blockchain wallet. The activation server 112 can receive the activation request from the computing device 102 and store an association between the wallet identifier and card identifier in a database thereof. The storage of the association can serve as registration of the blockchain wallet and identity of the consumer 114, which can satisfy the requirement for activation of the blockchain wallet. In such cases, the activation server 112 may not store any personally identifiable information of the consumer 114. In instances where the identification of the consumer 114 associated with a blockchain transaction is required (e.g., as a result of regulations or blockchain network 104 requirements), the wallet identifier for the blockchain wallet involved in the blockchain transaction can be identified and provided to the activation server 112. The activation server 112 can respond with the associated card identifier, which can be used by the interested party to request identity information of the consumer 114 from the financial institution 108. As a result, the activation server 112 can facilitate identification of consumers 114 without ever possessing any personally identifiable information.

Once the activation server 112 registers the association between the blockchain wallet and payment card 110, the activation server 112 can return an activation message to the computing device 102. The computing device 102 can receive the activation message and then generate an instruction, which can be transmitted to the payment card 110 or application program, as applicable, instructing that the blockchain wallet be unlocked or enabled for use in future blockchain transactions. As a result, the consumer 114 can then use their new blockchain wallet on a regulated blockchain only after registering their identity via the use of their payment card 110.

In some cases, the activation server 112 can include a digital signature in the activation message or can directly digitally sign the activation message. In such cases, the activation server 112 can have its own cryptographic key pair, where the activation server 112 generates digital signatures using its own private key. The activation server 112 can digitally sign data (e.g., the wallet identifier, the card identifier, a combination thereof, the activation message, etc.) using the private key, and the computing device 102 can validate the digital signature using the corresponding public key of the activation server's cryptographic key pair, which can be available using any suitable method. The computing device 102 can be configured to only instruct the payment card 110 or application program, as applicable, to unlock the blockchain wallet once the activation message has been successfully validated for additional security.

Using the methods and systems discussed herein, the identity of a consumer 114 associated with a blockchain wallet can be quickly registered via the use of a payment card 110 issued to the consumer 114 by a financial institution 108 to who the identity of the consumer 114 is known. The result is a system that can be quickly and easily in compliance with necessary regulations or requirements without modification to existing blockchain networks 104 and with minimal interaction by consumers 114. The system 100 is also applicable to both physical payment cards 110 and virtual payment cards that are stored on computing devices 102, such as can be stored in a smart phone. For physical cards, the consumer 114 can insert their payment card 110 into an automated teller machine (ATM) (e.g., as the computing device 102), where the consumer 114, using the interface of the ATM, can instruct the payment card 110 to generate a blockchain wallet and proceed with the above registration process, resulting in a registered blockchain wallet using a function of the ATM, which is a familiar process for the consumer 114. For virtual cards, the consumer 114 can use their existing banking application program to generate and register a new blockchain wallet using a trusted and familiar interface. This can provide for easy and convenient compliance with identity regulations for blockchain networks 104.

Computing Device

Figure 2:
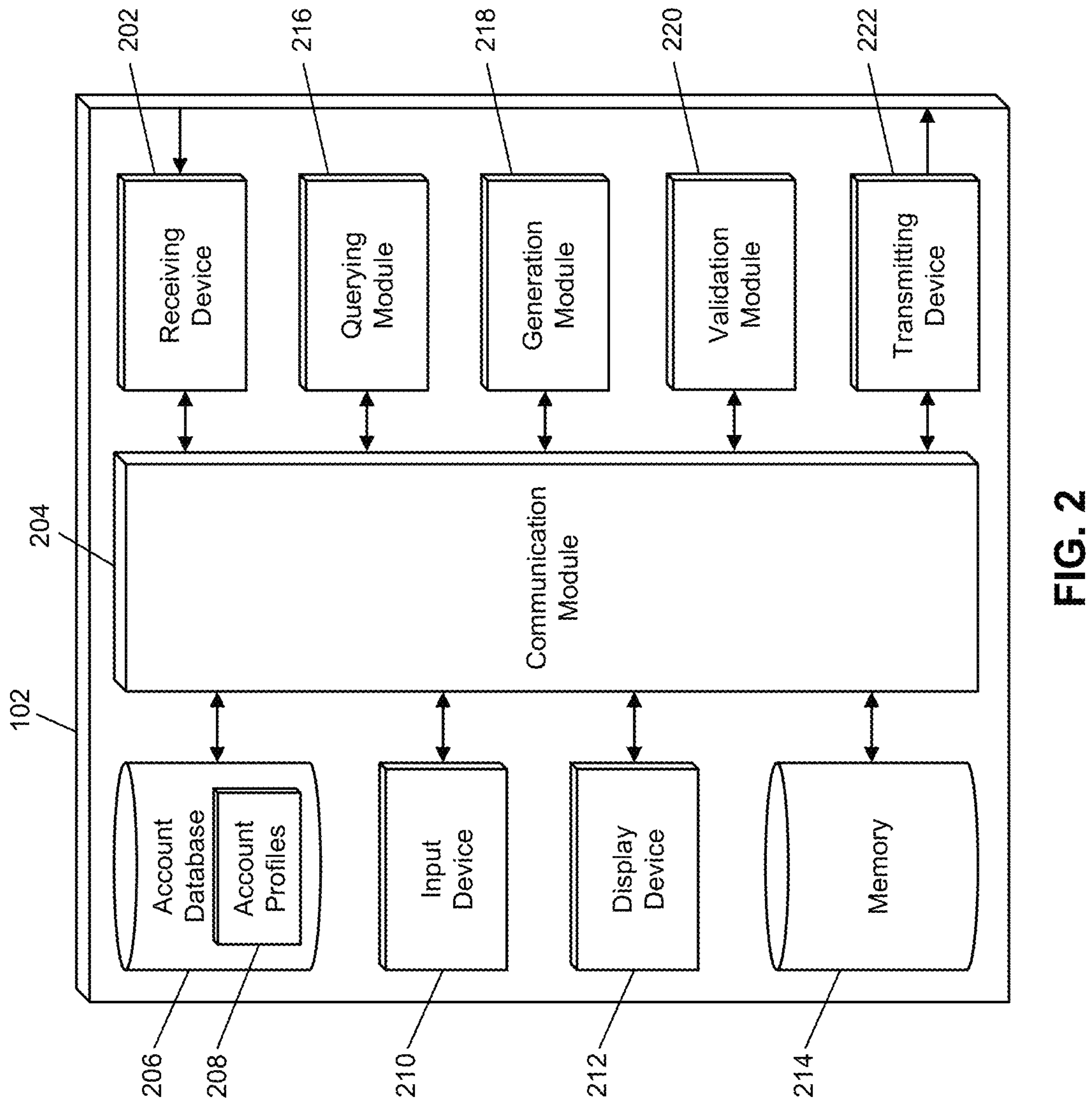
FIG. 2 is a block diagram illustrating the computing device in the system of FIG. 1 for the registration of a blockchain wallet using a payment card in accordance with exemplary embodiments.

FIG. 2 illustrates an embodiment of a computing device 102. It will be apparent to persons having skill in the relevant art that the embodiment of the computing device 102 illustrated in FIG. 2 is provided as illustration only and cannot be exhaustive to all possible configurations of the computing device 102 suitable for performing the functions as discussed herein. For example, the computer system 500 illustrated in FIG. 5 and discussed in more detail below can be a suitable configuration of the computing device 102. In some cases, additional components of the system 100, such as the blockchain nodes 106, financial institution 108, payment card 110, and activation server 112 can include the components illustrated in FIG. 2 and discussed below.

The computing device 102 can include a receiving device 202. The receiving device 202 can be configured to receive data over one or more networks via one or more network protocols. In some instances, the receiving device 202 can be configured to receive data from blockchain nodes 106, financial institutions 108, payment cards 110, activation servers 112, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by blockchain nodes 106 that can be superimposed or otherwise encoded with communication data, blockchain node addresses, activation server 112 data and addresses, etc. The receiving device 202 can also be configured to receive data signals electronically transmitted by financial institutions 108 and payment cards 110, which can be superimposed or otherwise encoded with payment details including card identifiers. The receiving device 202 can also be configured to receive data signals electronically transmitted by activation servers 112 that can be superimposed or otherwise encoded with activation messages, which can be digitally signed or include digital signatures.

The computing device 102 can also include a communication module 204. The communication module 204 can be configured to transmit data between modules, engines, databases, memories, and other components of the computing device 102 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the computing device 102 and external components of the computing device 102, such as externally connected databases, display devices, input devices, etc. The computing device 102 can also include a processing device. The processing device can be configured to perform the functions of the computing device 102 discussed herein as will be apparent to persons having skill in the relevant art. In some embodiments, the processing device can include and/or be comprised of a plurality of engines and/or modules specially configured to perform one or more functions of the processing device, such as a querying module 216, generation module 218, validation module 220, etc. As used herein, the term "module" can be software or hardware particularly programmed to receive an input, perform one or more processes using the input, and provides an output. The input, output, and processes performed by various modules will be apparent to one skilled in the art based upon the present disclosure.

The computing device 102 can also include an account database 206. The account database 206 can be configured to store one or more account profiles 208 using a suitable data storage format and schema. The account database 206 can be a relational database that utilizes structured query language for the storage, identification, modifying, updating, accessing, etc. of structured data sets stored therein. Each account profile 208 can be a structured data set configured to store data related to a consumer account, such as a transaction account or blockchain wallet, which can include, for example, card identifiers, wallet identifiers, payment details, cryptographic key pairs, unspent transaction outputs, account balances, etc.

The computing device 102 can also include a memory 214. The memory 214 can be configured to store data for use by the computing device 102 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the computing device 102 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein. The memory 214 can be configured to store, for example, cryptographic keys, cryptographic key pairs, cryptographic algorithms, encryption algorithms, communication information, data formatting rules, network identifiers, payment details, blockchain wallet data, etc.

The computing device 102 can also include an input device 210. The input device 210 can be configured to receive input by a user (e.g., the consumer 114) of the computing device 102, which can be provided to other devices or modules of the computing device 102, such as via the communication module 204. The input device 210 can be comprised of one or more input devices, which can include, for instance, a capacitive touch display, microphone, keyboard, mouse, camera, optical imaging device, trackpad, keypad, etc. The input device 210 can, for example, receive instructions from the consumer 114 for the generation of a blockchain wallet and submission of an activation request to the activation server 112.

The computing device 102 can also include a display device 212. The display device 212 can be configured to display data to a user (e.g., consumer 114) using one or more graphical user interfaces. Data for display on the display device 212 can be provided thereto by other devices or modules of the computing device 102 via the communication module 204. The display device 212 can be comprised of one or more devices, which can include, for instance, a capacitive touch display, liquid crystal display, light emitting diode display, thin film transistor display, etc. The display device 212 can be configured to display application program data via one or more user interfaces to the consumer 114, such as for the selection of commands to, for example, generate a blockchain wallet, select a payment card 110 for identification, submit an activation request, initiate a blockchain transaction, etc.

The computing device 102 can include a querying module 216. The querying module 216 can be configured to execute queries on databases to identify information. The querying module 216 can receive one or more data values or query strings and can execute a query string based thereon on an indicated database, such as the account database 206 of the computing device 102 to identify information stored therein. The querying module 216 can then output the identified information to an appropriate engine or module of the computing device 102 as necessary. The querying module 216 can, for example, execute a query on the account database 206 to identify an account profile 208 associated with a payment card 110 to identify a card identifier stored therein for an activation request.

The computing device 102 can also include a generation module 218. The generation module 218 can be configured to generate data for use by the computing device 102 in performing the functions discussed herein. The generation module 218 can receive instructions as input, can generate data based on the instructions, and can output the generated data to one or more modules of the computing device 102. For example, the generation module 218 can be configured to generate data messages, notification messages, response messages, cryptographic keys, blockchain transactions, blockchain data values, digital signatures, instructions, etc.

The computing device 102 can also include a validation module 220. The validation module 220 can be configured to perform validations for the computing device 102 as part of the functions discussed herein. The validation module 220 can receive instructions as input, which can also include data to be used in performing a validation, can perform a validation as requested, and can output a result of the validation to another module or engine of the computing device 102. The validation module 220 can, for example, be configured to validate digital signatures of activation messages prior to the unlocking of a blockchain wallet for use in a regulated blockchain.

The computing device 102 can also include a transmitting device 222. The transmitting device 222 can be configured to transmit data over one or more networks via one or more network protocols. In some instances, the transmitting device 222 can be configured to transmit data to blockchain nodes 106, financial institutions 108, payment cards 110, activation servers 112, and other entities via one or more communication methods, local area networks, wireless area networks, cellular communication, Bluetooth, radio frequency, the Internet, etc. In some embodiments, the transmitting device 222 can be comprised of multiple devices, such as different transmitting devices for transmitting data over different networks, such as a first transmitting device for transmitting data over a local area network and a second transmitting device for transmitting data via the Internet. The transmitting device 222 can electronically transmit data signals that have data superimposed that can be parsed by a receiving computing device. In some instances, the transmitting device 222 can include one or more modules for superimposing, encoding, or otherwise formatting data into data signals suitable for transmission.

The transmitting device 222 can be configured to electronically transmit data signals to blockchain nodes 106 that can be superimposed or otherwise encoded with requests for blockchain data, requests for activation server 112 data, etc. The transmitting device 222 can also be configured to electronically transmit data signals to financial institutions 108 and payment cards 110, which can be superimposed or otherwise encoded with requests for payment details and card identifiers, instructions for the unlocking of blockchain wallets, etc. The transmitting device 222 can also be configured to electronically transmit data signals to activation servers 112 that can be superimposed or otherwise encoded with activation requests, which can include card identifiers and wallet identifiers.

Process for Registration of a Blockchain Wallet Using a Payment Card

Figure 3A:
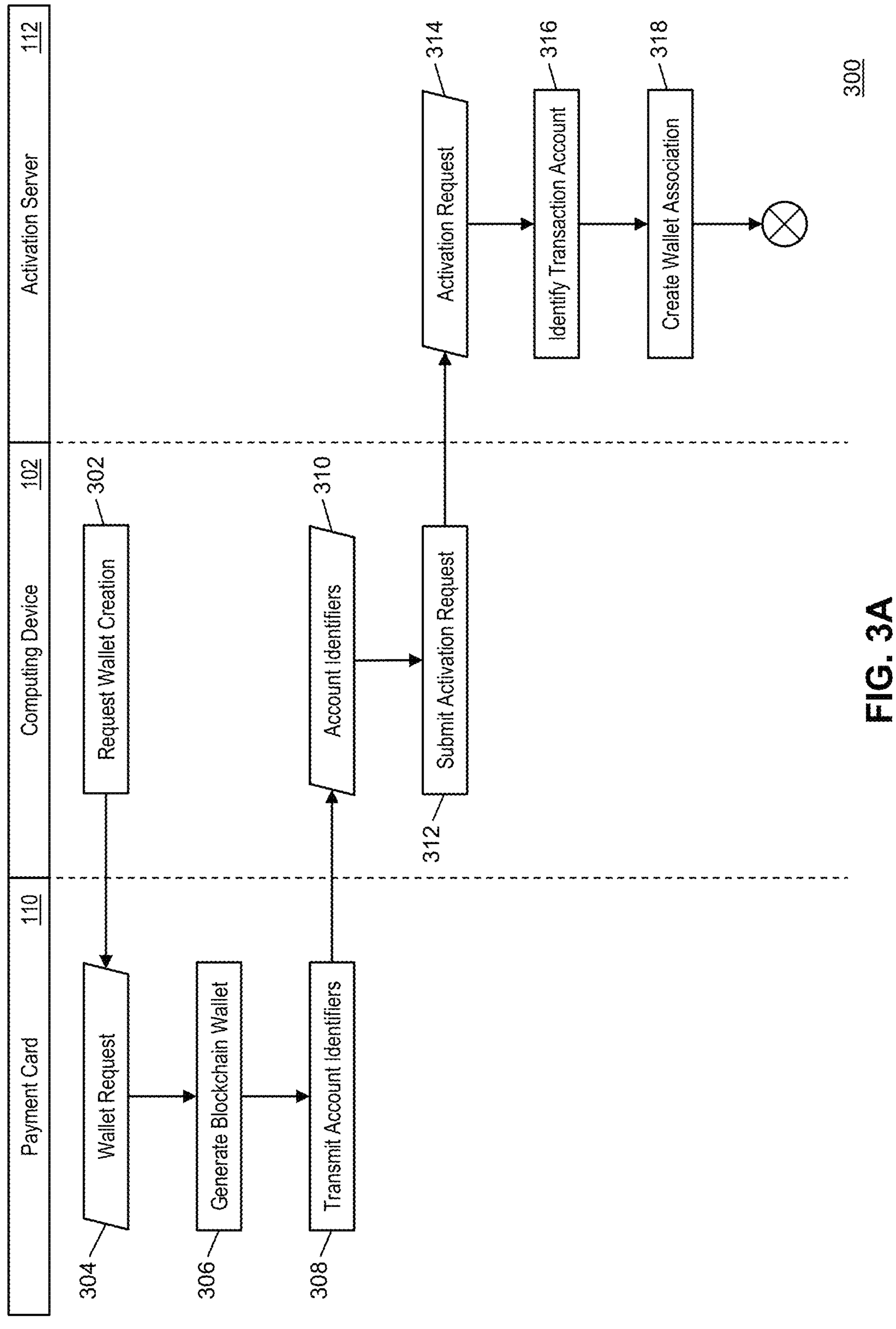
FIGS. 3A and 3B are a flow diagram illustrating a process for registration a blockchain wallet using a payment card as performed by the system of FIG. 1 in accordance with exemplary embodiments.
Figure 3B:
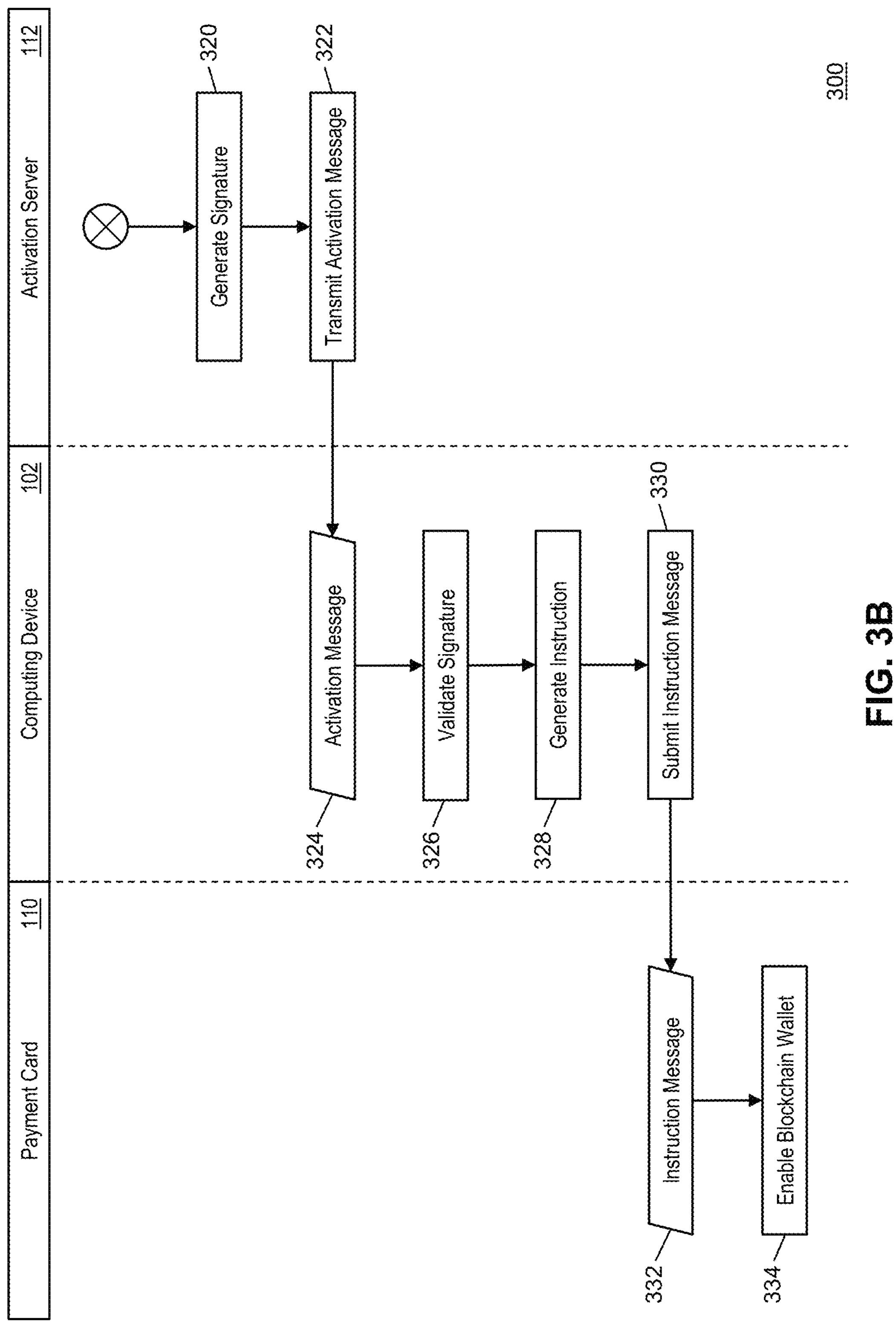

FIGS. 3A and 3B illustrate a process 300 for the registration of a blockchain wallet for a regulated blockchain with identity information associated with a payment card in the system 100 of FIG. 1.

In step 302, the transmitting device 222 of the computing device 102 can transmit a wallet creation request message to the payment card 110 (e.g., upon receipt of an instruction by the consumer 114 via the input device 210) using a suitable communication network and method, such as via near field communication. The wallet creation request message can include an instruction for the payment card 110 to generate a new blockchain wallet for a regulated blockchain. In step 304, the payment card 110 can receive the wallet request. In step 306, the payment card 110 can generate a blockchain wallet via the generation of a cryptographic key pair to be used as a blockchain wallet for the regulated blockchain. The payment card 110 can store the cryptographic key pair in a memory thereof and disable the blockchain wallet such that it is unable to be used until an activation instruction is received.

In step 308, the payment card 110 can electronically transmit a card identifier for the payment card 110 and a wallet identifier for the generated blockchain wallet to the computing device 102 using a suitable communication network and method. In step 310, the receiving device 202 of the computing device 102 can receive the account identifiers from the payment card 110. In step 312, the generation module 218 of the computing device 102 can generate an activation request message that includes the card identifier and wallet identifier that can be transmitted, by the transmitting device 222 of the computing device 102, to the activation server 112 using a suitable communication network and method. In step 314, the activation server 112 can receive the activation request message.

In step 316, the activation server 112 can identify the transaction account to which the new blockchain wallet is to be registered using the card identifier included in the activation request message. In step 318, the activation server 112 can create and store an association between the newly generated blockchain wallet and the payment card, such as by storing the wallet identifier and card identifier in an association database. In step 320, the activation server 112 can generate a digital signature using a private key of a cryptographic key pair associated with the activation server 112. The digital signature can be included in an activation message that is electronically transmitted, in step 322, by the activation server 112 to the computing device 102 using a suitable communication network and method.

In step 324, the receiving device 202 of the computing device 102 can receive the activation message with the digital signature from the activation server 112. In step 326, the validation module 220 of the computing device 102 can validate the digital signature using a public key of the cryptographic key pair associated with the activation server 112. Upon successful validation of the digital signature, the generation module 218 of the computing device 102 can, in step 328, generation an instruction for the payment card 110 to enable the blockchain wallet as a result of the received and validation activation message. In step 330, the transmitting device 222 of the computing device 102 can electronically transmit an instruction message that includes the generated instruction to the payment card 110 using a suitable communication network and method. In step 332, the payment card 110 can receive the instruction message and, in step 334, execute the instruction to enable the blockchain wallet for use in future blockchain transactions on the regulated blockchain.

Exemplary Method for Registration of Blockchain Wallets

Figure 4:
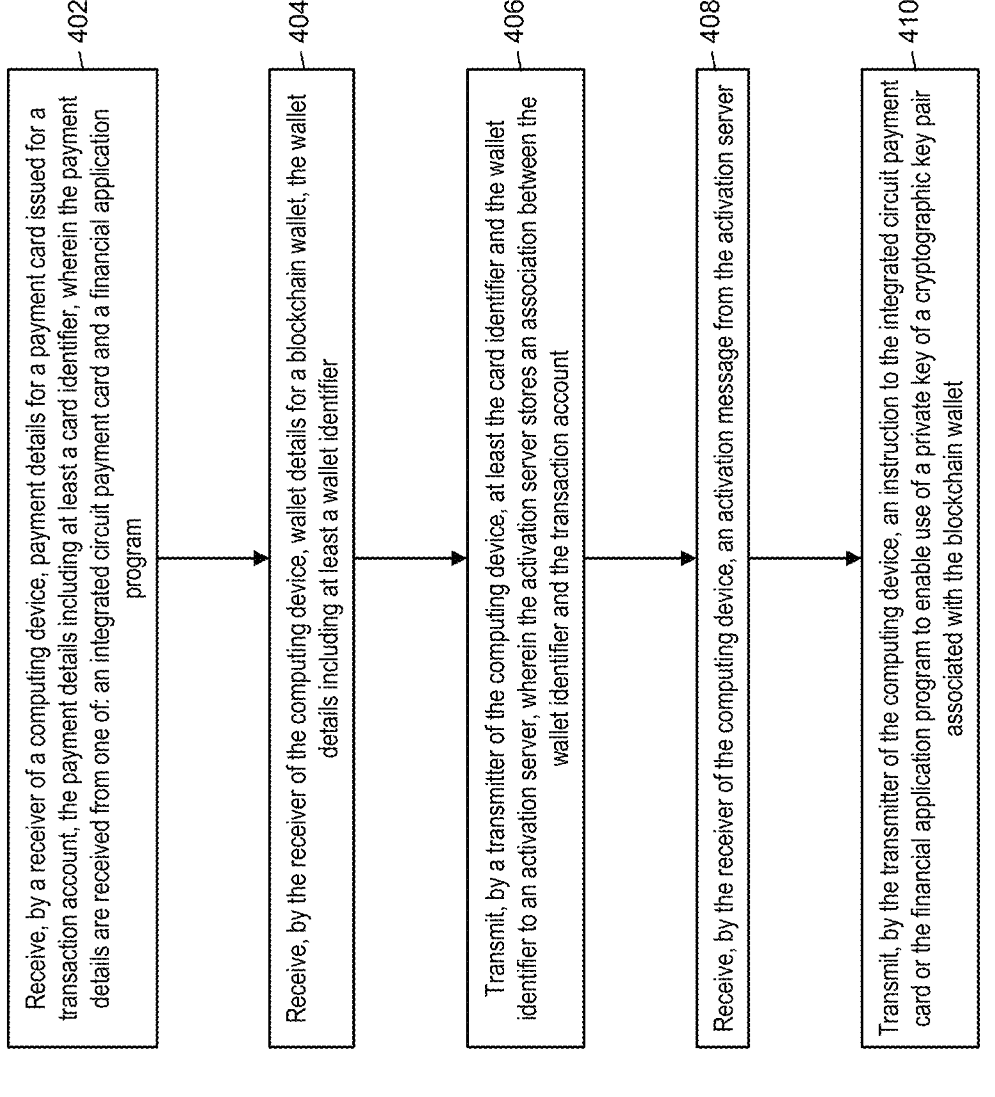
FIG. 4 is a flow chart illustrating an exemplary method for registration of an identified blockchain wallet using a payment card in accordance with exemplary embodiments.

FIG. 4 illustrates a method 400 for the registration of an identified blockchain wallet using a payment card.

In step 402, payment details for a payment card (e.g., payment card 110) issued for a transaction account can be received by a receiver (e.g., receiving device 202) of a computing device (e.g., computing device 102), the payment details including at least a card identifier, wherein the payment details are received from one of: an integrated circuit payment card and a financial application program. In step 404, wallet details for a blockchain wallet can be received by the receiver of the computing device, the wallet details including at least a wallet identifier. In step 406, at least the card identifier and the wallet identifier can be transmitted by a transmitter (e.g., transmitting device 222) to an activation server (e.g., activation server 112), wherein the activation server stores an association between the wallet identifier and the transaction account.

In step 408, an activation message can be received by the receiver of the computing device from the activation server. In step 410, an instruction can be transmitted by the transmitter of the computing device to the integrated circuit payment card or the financial application program to enable use of a private key of a cryptographic key pair associated with the blockchain wallet.

In one embodiment, the wallet identifier can be a public key of the cryptographic key pair associated with the blockchain wallet. In some embodiments, the activation message can include a digital signature generated by the activation server using a private key of a second cryptographic key pair, and the method 400 can further include validating, by a processor (e.g., validation module 220) of the computing device, the digital signature using a public key of the second cryptographic key pair. In a further embodiment, the method 400 can even further include transmitting, by the transmitter of the computing device, a validation message to the activation server upon successful validation of the digital signature. In another further embodiment, the instruction can be transmitted to the integrated circuit payment card or the financial application program after successful validation of the digital signature.

In one embodiment, the wallet details can be generated by the integrated circuit payment card or financial application program. In a further embodiment, the method 400 can also include: receiving, by an input device (e.g., input device 210) of the computing device, a request from a user of the computing device for generation of the blockchain wallet; and transmitting, by the transmitter of the computing device, an instruction to the integrated circuit payment card or the financial application program to generate the wallet details as a result of the received request. In some embodiments, the computing device can be one of: a mobile computing device, a smart phone, an automated teller machine, and the integrated circuit payment card.

Computer System Architecture

FIG. 5 illustrates a computer system 500 in which embodiments of the present disclosure, or portions thereof, can be implemented as computer-readable code. For example, the computing device 102, blockchain nodes 106, financial institution 108, payment card 110, and activation server 112 can be implemented in the computer system 500 using hardware, non-transitory computer readable media having instructions stored thereon, or a combination thereof and can be implemented in one or more computer systems or other processing systems. Hardware can embody modules and components used to implement the methods of FIGS. 3A, 3B, and 4.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 504 can be a special purpose or a general purpose processor device specifically configured to perform the functions discussed herein. The processor device 504 can be connected to a communications infrastructure 506, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 can also include a main memory 508 (e.g., random access memory, read-only memory, etc.), and can also include a secondary memory 510. The secondary memory 510 can include the hard disk drive 512 and a removable storage drive 514, such as a floppy disk drive, a magnetic tape drive, an optical disk drive, a flash memory, etc.

The removable storage drive 514 can read from and/or write to the removable storage unit 518 in a well-known manner. The removable storage unit 518 can include a removable storage media that can be read by and written to by the removable storage drive 514. For example, if the removable storage drive 514 is a floppy disk drive or universal serial bus port, the removable storage unit 518 can be a floppy disk or portable flash drive, respectively. In one embodiment, the removable storage unit 518 can be non-transitory computer readable recording media.

In some embodiments, the secondary memory 510 can include alternative means for allowing computer programs or other instructions to be loaded into the computer system 500, for example, the removable storage unit 522 and an interface 520. Examples of such means can include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 500 can also include a communications interface 524. The communications interface 524 can be configured to allow software and data to be transferred between the computer system 500 and external devices. Exemplary communications interfaces 524 can include a modem, a network interface (e.g., an Ethernet card), a communications port, a PCMCIA slot and card, etc. Software and data transferred via the communications interface 524 can be in the form of signals, which can be electronic, electromagnetic, optical, or other signals as will be apparent to persons having skill in the relevant art. The signals can travel via a communications path 526, which can be configured to carry the signals and can be implemented using wire, cable, fiber optics, a phone line, a cellular phone link, a radio frequency link, etc.

The computer system 500 can further include a display interface 502. The display interface 502 can be configured to allow data to be transferred between the computer system 500 and external display 530. Exemplary display interfaces 502 can include high-definition multimedia interface (HDMI), digital visual interface (DVI), video graphics array (VGA), etc. The display 530 can be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 508 and secondary memory 510, which can be memory semiconductors (e.g., DRAMs, etc.). These computer program products can be means for providing software to the computer system 500. Computer programs (e.g., computer control logic) can be stored in the main memory 508 and/or the secondary memory 510. Computer programs can also be received via the communications interface 524. Such computer programs, when executed, can enable computer system 500 to implement the present methods as discussed herein. In particular, the computer programs, when executed, can enable processor device 504 to implement the methods illustrated by FIGS. 3A, 3B, and 4, as discussed herein. Accordingly, such computer programs can represent controllers of the computer system 500. Where the present disclosure is implemented using software, the software can be stored in a computer program product and loaded into the computer system 500 using the removable storage drive 514, interface 520, and hard disk drive 512, or communications interface 524.

The processor device 504 can comprise one or more modules or engines configured to perform the functions of the computer system 500. Each of the modules or engines can be implemented using hardware and, in some instances, can also utilize software, such as corresponding to program code and/or programs stored in the main memory 508 or secondary memory 510. In such instances, program code can be compiled by the processor device 504 (e.g., by a compiling module or engine) prior to execution by the hardware of the computer system 500. For example, the program code can be source code written in a programming language that is translated into a lower level language, such as assembly language or machine code, for execution by the processor device 504 and/or any additional hardware components of the computer system 500. The process of compiling can include the use of lexical analysis, preprocessing, parsing, semantic analysis, syntax-directed translation, code generation, code optimization, and any other techniques that can be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for registration of an identified blockchain wallet using a payment card. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for registration of an identified blockchain wallet using a payment card, comprising:

receiving, by a receiver of a computing device, payment details for a payment card issued to a consumer for a transaction account, the payment details including at least a card identifier, wherein the payment details are received from one of: an integrated circuit payment card and a financial application program executing on the computing device;

receiving, by the receiver of the computing device, wallet details for a blockchain wallet, the wallet details including at least a wallet identifier;

transmitting, by a transmitter of the computing device, a new blockchain wallet generation request to one of: the integrated circuit payment card and the financial application program;

creating, by one of the integrated circuit payment card and the financial application program, the new blockchain wallet by generating a cryptographic key pair;

upon creating the new blockchain wallet, disabling, by one of the integrated circuit payment card and the financial application program, the new blockchain wallet such that the new blockchain wallet is unable to be used until an activation instruction is received;

transmitting, by a transmitter of the computing device, at least the card identifier and the wallet identifier to an activation server, wherein the activation server stores an association between the wallet identifier and the transaction account and transmits an activation message to the computing device;

receiving, by the receiver of the computing device, the activation message from the activation server; and in response to receiving the activation message from the activation server, generating, by processor of the computing device, an unlock instruction for unlocking the new blockchain wallet;

transmitting, by the transmitter of the computing device, the unlock instruction to the integrated circuit payment card or the financial application program; and in response to receiving the unlock instruction, unlocking, by the integrated circuit payment card or the financial application program, the new blockchain wallet, enabling use of a private key of the cryptographic key pair associated with the blockchain wallet for use in blockchain transactions.

2. The method of claim 1, wherein the wallet identifier is a public key of the cryptographic key pair associated with the blockchain wallet.

3. The method of claim 1, wherein the activation message includes a digital signature generated by the activation server using a private key of a second cryptographic key pair, and the method further comprises:

validating, by a processor of the computing device, the digital signature using a public key of the second cryptographic key pair.

4. The method of claim 3, further comprising:

transmitting, by the transmitter of the computing device, a validation message to the activation server upon successful validation of the digital signature.

5. The method of claim 3, wherein the instruction is transmitted to the integrated circuit payment card or the financial application program after successful validation of the digital signature.

6. The method of claim 1, wherein the wallet details are generated by the integrated circuit payment card or financial application program.

7. The method of claim 6, further comprising:

receiving, by an input device of the computing device, a request from a user of the computing device for generation of the blockchain wallet; and transmitting, by the transmitter of the computing device, an instruction to the integrated circuit payment card or the financial application program to generate the wallet details as a result of the received request.

8. The method of claim 1, wherein the computing device is one of: a mobile computing device, a smart phone, an automated teller machine, and the integrated circuit payment card.

9. A system for registration of an identified blockchain wallet using a payment card, comprising:

an activation server;

a computing device; and one of: an integrated circuit payment card and a financial application program, wherein the computing device includes a receiver receiving payment details for a payment card issued to a consumer for a transaction account, the payment details including at least a card identifier, wherein the payment details are received from the integrated circuit payment card or the financial application program, and receiving wallet details for a blockchain wallet, the wallet details including at least a wallet identifier, a transmitter transmitting a new blockchain wallet generation request to one of the: integrated circuit payment card and the financial application program, and a processor, wherein one of the integrated circuit payment card and the financial application program (i) creates the new blockchain wallet by generating a cryptographic key pair, and (ii) upon creating the new blockchain wallet, disables the new blockchain wallet such that the new blockchain wallet is unable to be used until an activation instruction is received, wherein the transmitter, of the computing device further (i) transmits at least the card identifier and the wallet identifier to an activation server, wherein the activation server stores an association between the wallet identifier and the transaction account, and (ii) transmits an activation message to the computing device, wherein the receiver of the computing device further receives the activation message from the activation server, wherein the processor of the computing device, in response to receiving the activation message, generates an unlock instruction for unlocking the new blockchain wallet;

wherein the transmitter of the computing device further transmits the unlock instruction to the integrated circuit payment card or the financial application program; and wherein, in response to receiving the unlock instruction, at least one of the integrated circuit payment card and the financial application program unlocks the new blockchain wallet, enabling use of a private key of the cryptographic key pair associated with the blockchain wallet for use in blockchain transactions.

10. The system of claim 9, wherein the wallet identifier is a public key of the cryptographic key pair associated with the blockchain wallet.

11. The system of claim 9, wherein the activation message includes a digital signature generated by the activation server using a private key of a second cryptographic key pair, and the computing device further includes a processor validating the digital signature using a public key of the second cryptographic key pair.

12. The system of claim 11, wherein the transmitter of the computing device transmits a validation message to the activation server upon successful validation of the digital signature.

13. The system of claim 11, wherein the instruction is transmitted to the integrated circuit payment card or the financial application program after successful validation of the digital signature.

14. The system of claim 9, wherein the wallet details are generated by the integrated circuit payment card or financial application program.

15. The system of claim 14, wherein the computing device further includes an input device receiving a request from a user of the computing device for generation of the blockchain wallet, and the transmitter of the computing device transmits an instruction to the integrated circuit payment card or the financial application program to generate the wallet details as a result of the received request.

16. The system of claim 9, wherein the computing device is one of: a mobile computing device, a smart phone, an automated teller machine, and the integrated circuit payment card.

* * * * *